United States Patent
Ando (10) Patent No.: US 9,569,600 B2
(45) Date of Patent: Feb. 14, 2017

(54) INFORMATION PROCESSING APPARATUS WITH LICENSE INFORMATION MANAGEMENT

(71) Applicant: FUJI XEROX CO., LTD., Tokyo (JP)

(72) Inventor: Yoshinori Ando, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/197,471

(22) Filed: Mar. 5, 2014

(65) Prior Publication Data

US 2015/0033355 A1     Jan. 29, 2015

(30) Foreign Application Priority Data

Jul. 25, 2013    (JP) .................................. 2013-154435

(51) Int. Cl.
    *G06F 21/12*      (2013.01)
    *G06F 21/10*      (2013.01)

(52) U.S. Cl.
    CPC .............. *G06F 21/121* (2013.01); *G06F 21/10* (2013.01); *G06F 21/105* (2013.01); *G06F 21/12* (2013.01); *G06F 21/126* (2013.01)

(58) Field of Classification Search
    CPC ........ G06F 21/10; G06F 21/105; G06F 21/12; G06F 21/121; G06F 21/126
    See application file for complete search history.

(56) References Cited

U.S. PATENT DOCUMENTS

| | | | | |
|---|---|---|---|---|
| 5,925,127 A | * | 7/1999 | Ahmad ............................ | 726/31 |
| 2002/0029347 A1 | * | 3/2002 | Edelman ....................... | 713/193 |
| 2002/0100037 A1 | * | 7/2002 | Kitagawa ....................... | 717/174 |
| 2007/0016531 A1 | * | 1/2007 | Boomershine et al. ........ | 705/59 |
| 2008/0209569 A1 | * | 8/2008 | Araki .............................. | 726/26 |
| 2009/0024984 A1 | | 1/2009 | Maeda | |
| 2013/0010329 A1 | | 1/2013 | Yuki | |
| 2013/0133080 A1 | | 5/2013 | Yuki | |
| 2013/0167250 A1 | * | 6/2013 | Balasubramanian ........... | 726/28 |
| 2013/0185197 A1 | | 7/2013 | Brown et al. | |

FOREIGN PATENT DOCUMENTS

| | | |
|---|---|---|
| JP | 2003-085059 A | 3/2003 |
| JP | 2004-048635 A | 2/2004 |
| JP | 2006-146358 A | 6/2006 |
| JP | A-2009-26065 | 2/2009 |

(Continued)

OTHER PUBLICATIONS

Jun. 26, 2016 Office Action issued in Japanese Patent Application No. 2013-154435.

(Continued)

*Primary Examiner* — Theodore C Parsons (74) *Attorney, Agent, or Firm* — Oliff PLC (57) ABSTRACT

A license management system including an information processing apparatus includes a detecting unit and a license update requesting unit. The detecting unit detects a status of an element involved in execution of software. The license update requesting unit requests an update of license information of the software if the status detected by the detecting unit is a status that does not satisfy a condition desired for executing the software. The license management system may be usable within an image forming apparatus and include a user interface having an IC card reader.

5 Claims, 6 Drawing Sheets (56) References Cited

FOREIGN PATENT DOCUMENTS

| | | |
|---|---|---|
| JP | 2009-116392 A | 5/2009 |
| JP | 2011-059805 A | 3/2011 |
| JP | 2012-008927 A | 1/2012 |
| JP | 2013-015995 A | 1/2013 |
| JP | 2013-109413 A | 6/2013 |

OTHER PUBLICATIONS

Sep. 27, 2016 Office Action issued in Japanese Patent Application No. 2013-154435.

* cited by examiner

| ACCOUNT | APPLICATION SOFTWARE | ELEMENT TO BE USED | ALLOCATION STATE |
|---|---|---|---|
| ADMINISTRATOR α | SOFTWARE A | IC CARD READER | INFORMATION PROCESSING APPARATUS A |
| ADMINISTRATOR α | SOFTWARE A | IC CARD READER | INFORMATION PROCESSING APPARATUS B |
| ADMINISTRATOR α | SOFTWARE A | IC CARD READER | UNALLOCATED |
| ADMINISTRATOR α | SOFTWARE A | IC CARD READER | UNALLOCATED |
| ADMINISTRATOR α | SOFTWARE B | FACSIMILE COMMUNICATION DEVICE | INFORMATION PROCESSING APPARATUS A |
| ADMINISTRATOR α | SOFTWARE B | FACSIMILE COMMUNICATION DEVICE | INFORMATION PROCESSING APPARATUS B |
| ADMINISTRATOR α | SOFTWARE B | FACSIMILE COMMUNICATION DEVICE | UNALLOCATED |
| ADMINISTRATOR β | SOFTWARE C | SECURITY SOFTWARE | INFORMATION PROCESSING APPARATUS A |
| ADMINISTRATOR β | SOFTWARE C | SECURITY SOFTWARE | INFORMATION PROCESSING APPARATUS B |
| ADMINISTRATOR β | SOFTWARE C | SECURITY SOFTWARE | INFORMATION PROCESSING APPARATUS C |

FIG. 6

| ACCOUNT | APPLICATION SOFTWARE | ELEMENT TO BE USED | ALLOCATION STATE |
|---|---|---|---|
| ADMINISTRATOR α | SOFTWARE A | IC CARD READER | UNALLOCATED |
| ADMINISTRATOR α | SOFTWARE A | IC CARD READER | INFORMATION PROCESSING APPARATUS B |
| ADMINISTRATOR α | SOFTWARE A | IC CARD READER | UNALLOCATED |
| ADMINISTRATOR α | SOFTWARE A | IC CARD READER | UNALLOCATED |
| ADMINISTRATOR α | SOFTWARE B | FACSIMILE COMMUNICATION DEVICE | INFORMATION PROCESSING APPARATUS A |
| ADMINISTRATOR α | SOFTWARE B | FACSIMILE COMMUNICATION DEVICE | INFORMATION PROCESSING APPARATUS B |
| ADMINISTRATOR α | SOFTWARE B | FACSIMILE COMMUNICATION DEVICE | UNALLOCATED |
| ADMINISTRATOR β | SOFTWARE C | SECURITY SOFTWARE | INFORMATION PROCESSING APPARATUS A |
| ADMINISTRATOR β | SOFTWARE C | SECURITY SOFTWARE | INFORMATION PROCESSING APPARATUS B |
| ADMINISTRATOR β | SOFTWARE C | SECURITY SOFTWARE | INFORMATION PROCESSING APPARATUS C |

INFORMATION PROCESSING APPARATUS WITH LICENSE INFORMATION MANAGEMENT

CROSS-REFERENCE TO RELATED APPLICATIONS

This application is based on and claims priority under 35 USC 119 from Japanese Patent Application No. 2013-154435 filed Jul. 25, 2013.

BACKGROUND

Technical Field

The present invention relates to information processing apparatuses, license management systems, and non-transitory computer readable media.

SUMMARY

According to an aspect of the invention, there is provided an information processing apparatus including a detecting unit and a license update requesting unit. The detecting unit detects a status of an element involved in execution of software. The license update requesting unit requests an update of license information of the software if the status detected by the detecting unit is a status that does not satisfy a condition desired for executing the software.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described below with reference to the drawings.

Figure 1:
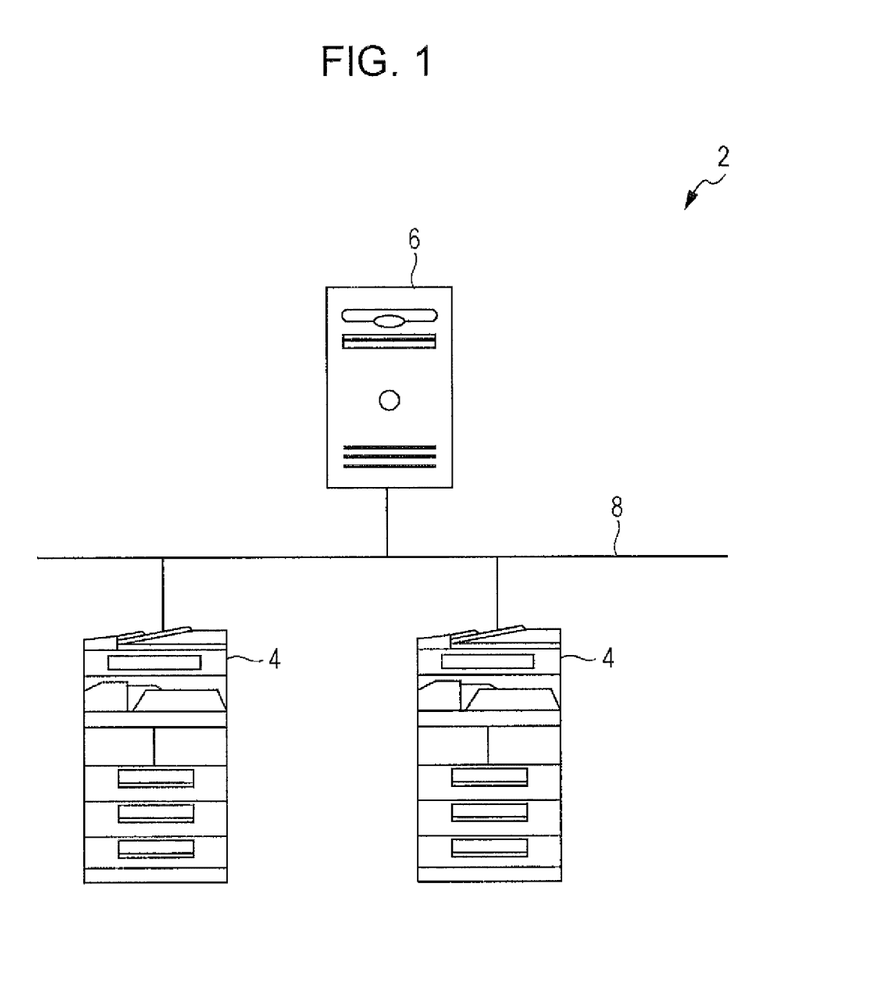
FIG. 1 schematically illustrates a license management system according to an exemplary embodiment of the present invention.

FIG. 1 schematically illustrates a license management system 2 according to an exemplary embodiment of the present invention. As shown in FIG. 1, the license management system 2 includes information processing apparatuses 4, in which software is installed and that execute the software, and a license management apparatus 6 that manages licenses for the software. The information processing apparatuses 4 and the license management apparatus 6 are connected by a network 8, which includes, for example, the Internet. The license management system 2 may include a single information processing apparatus 4 or multiple information processing apparatuses 4. For example, each information processing apparatus 4 may be a so-called multi-function apparatus having a printing function, a scanning function, and a facsimile function or may be a terminal apparatus such as a personal computer. The license management apparatus 6 functions as a computer and serves as a server that manages the licenses for the software.

First, the process of how the software becomes usable in the license management system 2 will be described. For example, a user, who is an administrator, purchases a license for the software to be used in each information processing apparatus 4 for the number of information processing apparatuses 4 into which the user desires to install the software. Information about each purchased license is managed by the license management apparatus 6.

Subsequently, for example, the software is installed in each information processing apparatus 4 by an operation performed by the administrator so that the software becomes usable. In this case, the information managed by the license management apparatus 6 is checked. Of the purchased licenses, if there is an unallocated license that is not allocated to any of the information processing apparatuses 4, the installation is permitted.

Figure 2:
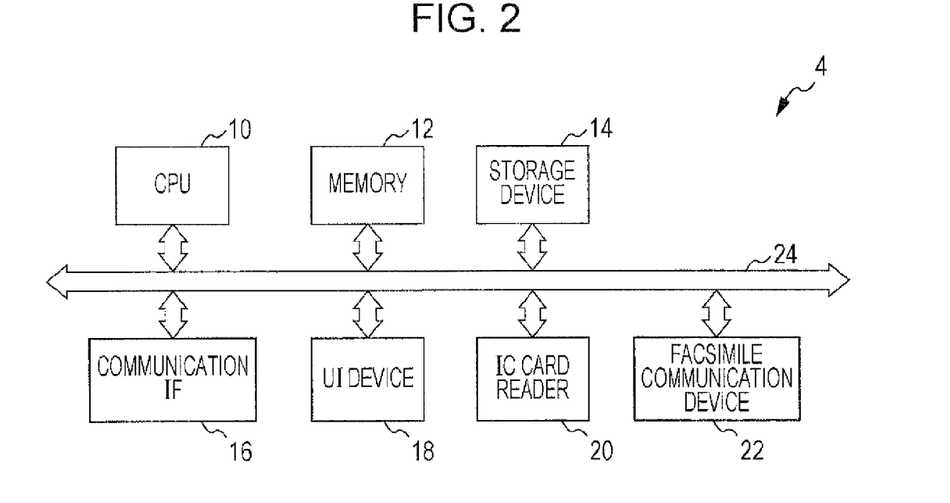
FIG. 2 schematically illustrates a hardware configuration of an information processing apparatus.

FIG. 2 schematically illustrates a hardware configuration of each information processing apparatus 4. As shown in FIG. 2, the information processing apparatus 4 includes a central processing unit (CPU) 10, a memory 12, a storage device 14 such as a hard disk drive (HDD), a communication interface (IF) 16 that transmits data to and receives data from, for example, an external device via the network 8, a user interface (UI) device 18 including a touchscreen or a liquid crystal display and a keyboard, an integrated-circuit (IC) card reader 20, and a facsimile communication device 22. These elements are connected to one another via a control bus 24.

The CPU 10 executes processing on the basis of a control program stored in the memory 12 or the storage device 14 so as to control the operation of the information processing apparatus 4. In this exemplary embodiment, the CPU 10 is described as being configured to read the control program from the memory 12 or the storage device 14 and execute the control program. Alternatively, the program may be stored in a storage medium, such as a compact disc read-only memory (CD-ROM), and be provided to the CPU 10, or the program may be provided to the CPU 10 via the network 8.

The IC card reader 20 is configured to read information recorded in a IC card provided by the user and is removably set in the information processing apparatus 4.

The facsimile communication device 22 is configured to perform facsimile transmission or reception and is, for example, a facsimile card removably set in the information processing apparatus 4.

Figure 3:
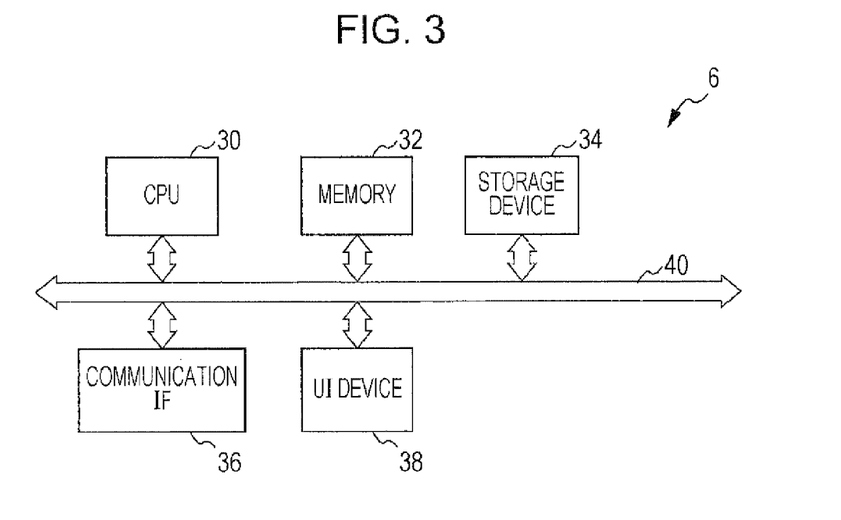
FIG. 3 schematically illustrates a hardware configuration of a license management apparatus.

FIG. 3 schematically illustrates a hardware configuration of the license management apparatus 6. As shown in FIG. 3, the license management apparatus 6 includes a CPU 30, a memory 32, a storage device 34 such as a hard disk drive (HDD), a communication interface (IF) 36 that transmits data to and receives data from, for example, an external device via the network 8, and a user interface (UI) device 38 including a touchscreen or a liquid crystal display and a keyboard. These elements are connected to one another via a control bus 40.

The CPU 30 executes processing on the basis of a control program stored in the memory 32 or the storage device 34 so as to control the operation of the license management apparatus 6. In this exemplary embodiment, the CPU 30 is described as being configured to read the control program from the memory 32 or the storage device 34 and execute the control program. Alternatively, the program may be stored in a storage medium, such as a CD-ROM, and be provided to the CPU 30, or the program may be provided to the CPU 30 via the network 8.

Next, a functional configuration of the license management system 2 will be described. In this exemplary embodiment, software installed in each information processing apparatus 4 includes software A that controls the IC card reader 20, software B that controls the facsimile communication device 22, and software C that operates in an environment in which security software that encrypts data stored in the storage device 14 operates. The licenses for the software A, the software B, and the software C are managed by the license management apparatus 6.

Figure 4:
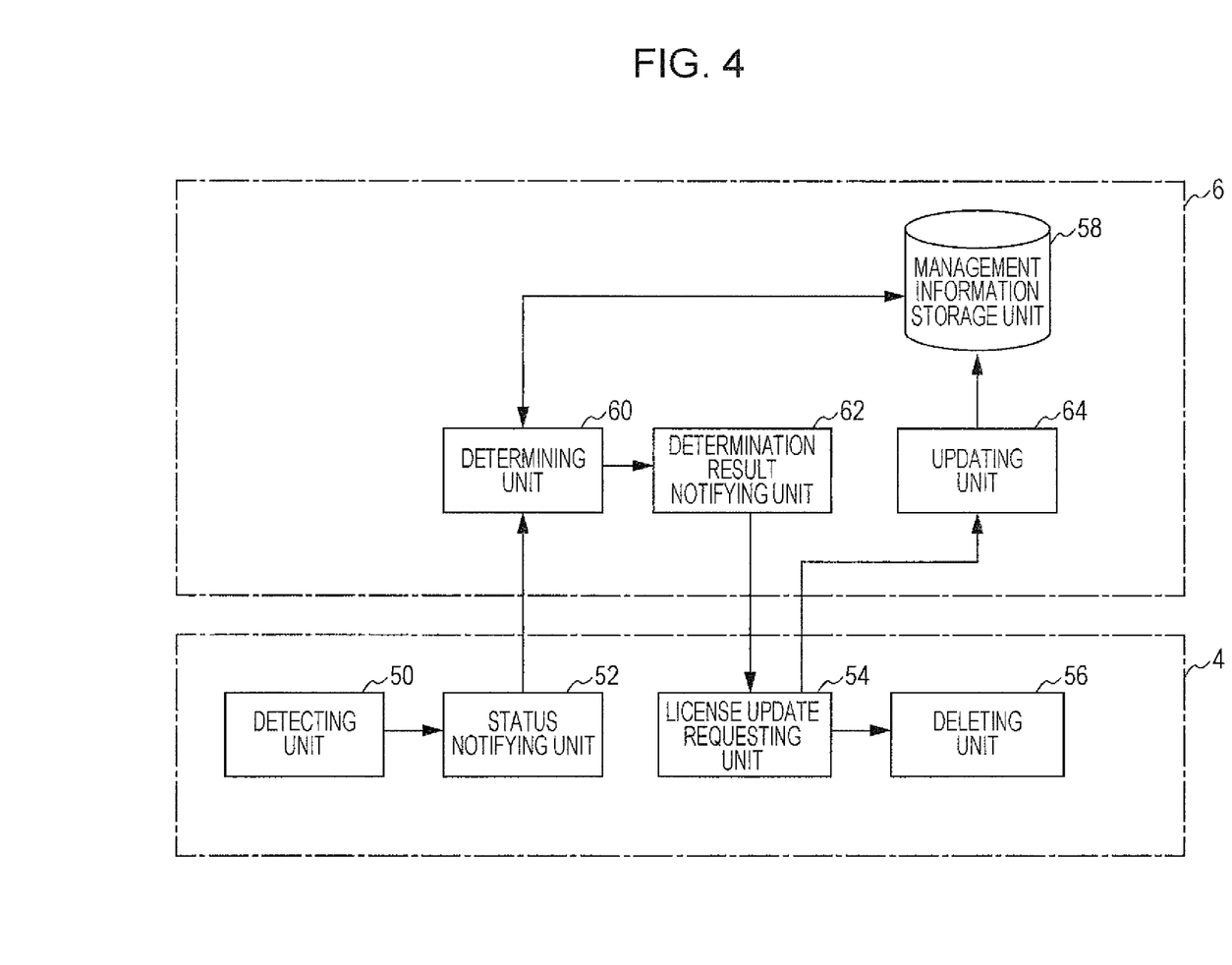
FIG. 4 is a block diagram illustrating a functional configuration of the license management system realized by executing a control program.

FIG. 4 is a block diagram illustrating the functional configuration of the license management system 2 realized by executing the aforementioned control program.

As shown in FIG. 4, the information processing apparatus 4 includes a detecting unit 50, a status notifying unit 52, a license update requesting unit 54, and a deleting unit 56.

The detecting unit 50 detects the status of an element involved in the execution of software installed in the information processing apparatus 4. The term "element" in this case refers to an element included in the information processing apparatus 4 and includes other software in addition to a hardware device. As an element involved in software execution, the detecting unit 50 may detect the status of a device controlled by the aforementioned software or the status of another software used for executing the aforementioned software, or may detect the status of a device used for executing the software.

Examples of the status of an element detected by the detecting unit 50 include a failure of a device serving as the element, removal of a device serving as the element, deletion of software serving as the element, and disablement of software serving as the element.

In this exemplary embodiment, the detecting unit 50 detects the status of each of the IC card reader 20, the facsimile communication device 22, and the aforementioned security software.

The status notifying unit 52 notifies the license management apparatus 6 of the status detected by the detecting unit 50. In this exemplary embodiment, if the detecting unit 50 detects that the IC card reader 20 or the facsimile communication device 22 is faulty or has been removed, and if the detecting unit 50 detects that the function of the security software has been disabled, the status notifying unit 52 notifies the license management apparatus 6 of information indicating the detected status. Together with this information, the status notifying unit 52 also notifies the license management apparatus 6 of information used for identifying the information processing apparatus 4 serving as the notification source.

If the status detected by the detecting unit 50 does not satisfy a condition desired for executing the software, the license update requesting unit 54 makes a request to the license management apparatus 6 for an update of the license information of this software. Thus, for example, the license for this software is returned. In this exemplary embodiment, if a notification indicating that the software is non-executable is received from the license management apparatus 6, the license update requesting unit 54 requests an update of the license information of this software and performs a deactivation process for cancelling the license.

If the status detected by the detecting unit 50 does not satisfy the condition desired for executing the software, the deleting unit 56 uninstalls this software. With this uninstallation process, program data or a portion or all of setting information for this software is/are deleted from the storage device 14 or the memory 12 of the information processing apparatus 4.

In this exemplary embodiment, if the status detected by the detecting unit 50 does not satisfy the condition desired for executing the software and if this status continues for a preset time period or longer, the deleting unit 56 uninstalls the software.

For example, if the condition desired for executing the software is not satisfied due to a fault in a device, it is assumed that the normal state may be recovered from the faulty state by, for example, repair. Therefore, for example, if the detecting unit 50 detects that a device is faulty, the deleting unit 56 may be configured not to perform the uninstallation by determining that the faulty state is only temporary and may not continue for the preset time period or longer. Furthermore, the deleting unit 56 may be configured not to perform the uninstallation if an input operation indicating that the continuation of the status detected by the detecting unit 50 is shorter than the preset time period is received from an operator.

As shown in FIG. 4, the license management apparatus 6 includes a management information storage unit 58, a determining unit 60, a determination result notifying unit 62, and an updating unit 64.

The management information storage unit 58 stores management information used for managing software licenses.

Figure 5:
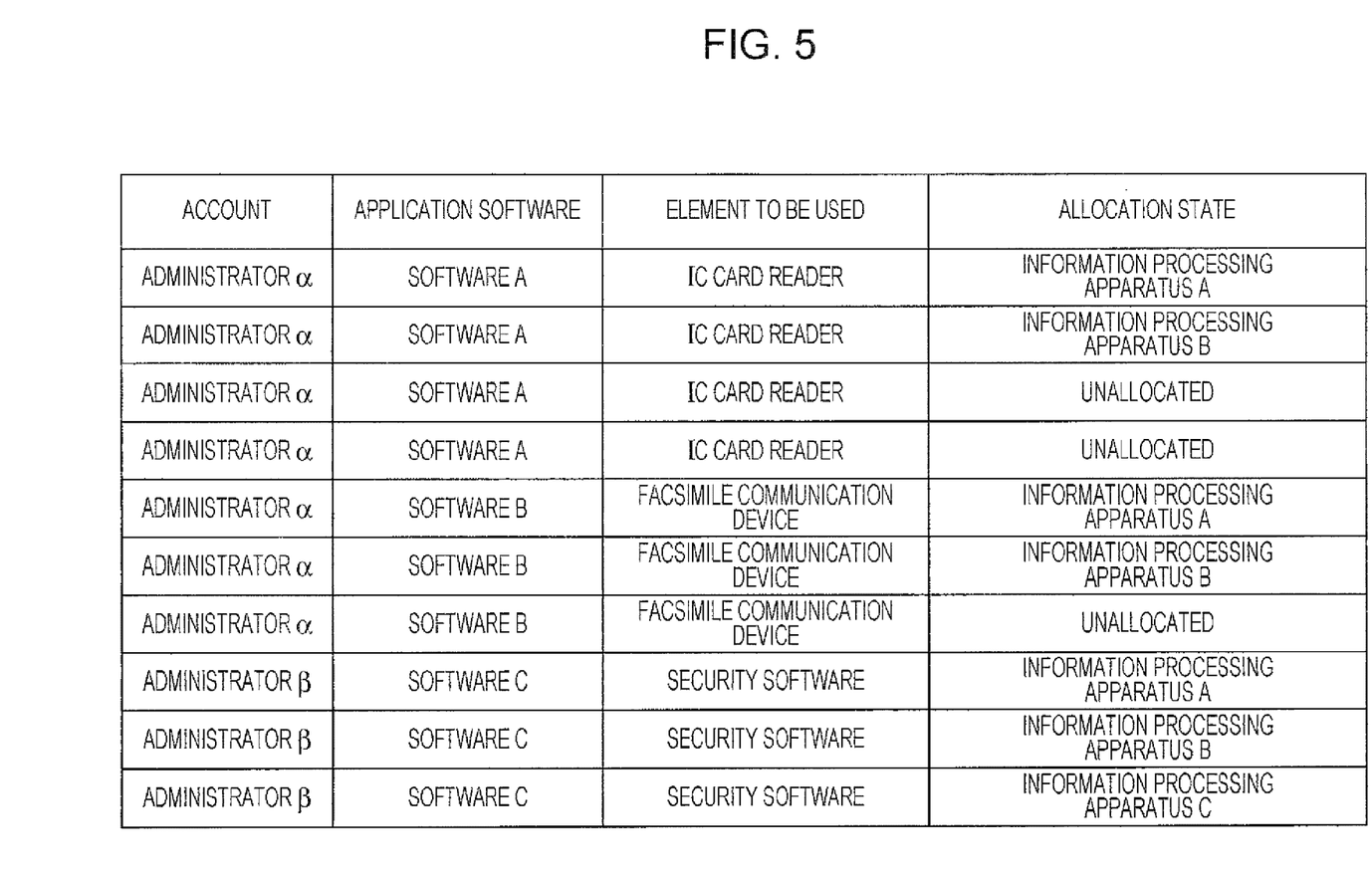
FIG. 5 is a table illustrating an example of management information stored in a management information storage unit.

FIG. 5 is a table illustrating an example of management information stored in the management information storage unit 58.

As shown in FIG. 5, the management information storage unit 58 stores information for each license as management information. In detail, the management information stored for each license in the management information storage unit 58 includes account information indicating a user who has purchased the license, the software corresponding to the license, an element used for executing the software, and an allocation state of the license.

For example, according to the management information shown in FIG. 5, four licenses for the software A have been purchased by an administrator α. Of the four licenses, one license is allocated to an information processing apparatus A (i.e., the software A is installed in the information processing apparatus A), one license is allocated to an information processing apparatus B (i.e., the software A is installed in the information processing apparatus B), and the two remaining licenses are surplus licenses that are not allocated yet. The IC card reader 20 is the element used for executing the software A.

In a case where the element status is notified from the information processing apparatus 4, the determining unit 60 determines whether or not this element status satisfies the condition desired for executing the software.

In this exemplary embodiment, when a notification is received from the status notifying unit 52 of the information processing apparatus 4, the determining unit 60 refers to the management information stored in the management information storage unit 58 and checks whether or not software installed in the information processing apparatus 4 serving as the notification source exists. If the software installed in the information processing apparatus 4 serving as the notification source exists, the determining unit 60 checks the element to be used for executing the software. When the checked element matches the element corresponding to the notification, the determining unit 60 determines that the software in the information processing apparatus 4 serving as the notification source has become non-executable.

If the determining unit 60 determines that the software in the information processing apparatus 4 is non-executable, the determination result notifying unit 62 notifies the information processing apparatus 4 of the non-executable software.

If a request for updating the software license information is received from the information processing apparatus 4, the updating unit 64 updates the management information stored in the management information storage unit 58. In detail, the information indicating that the license is allocated to the information processing apparatus 4 is updated to information indicating that the license is unallocated.

Figure 6:
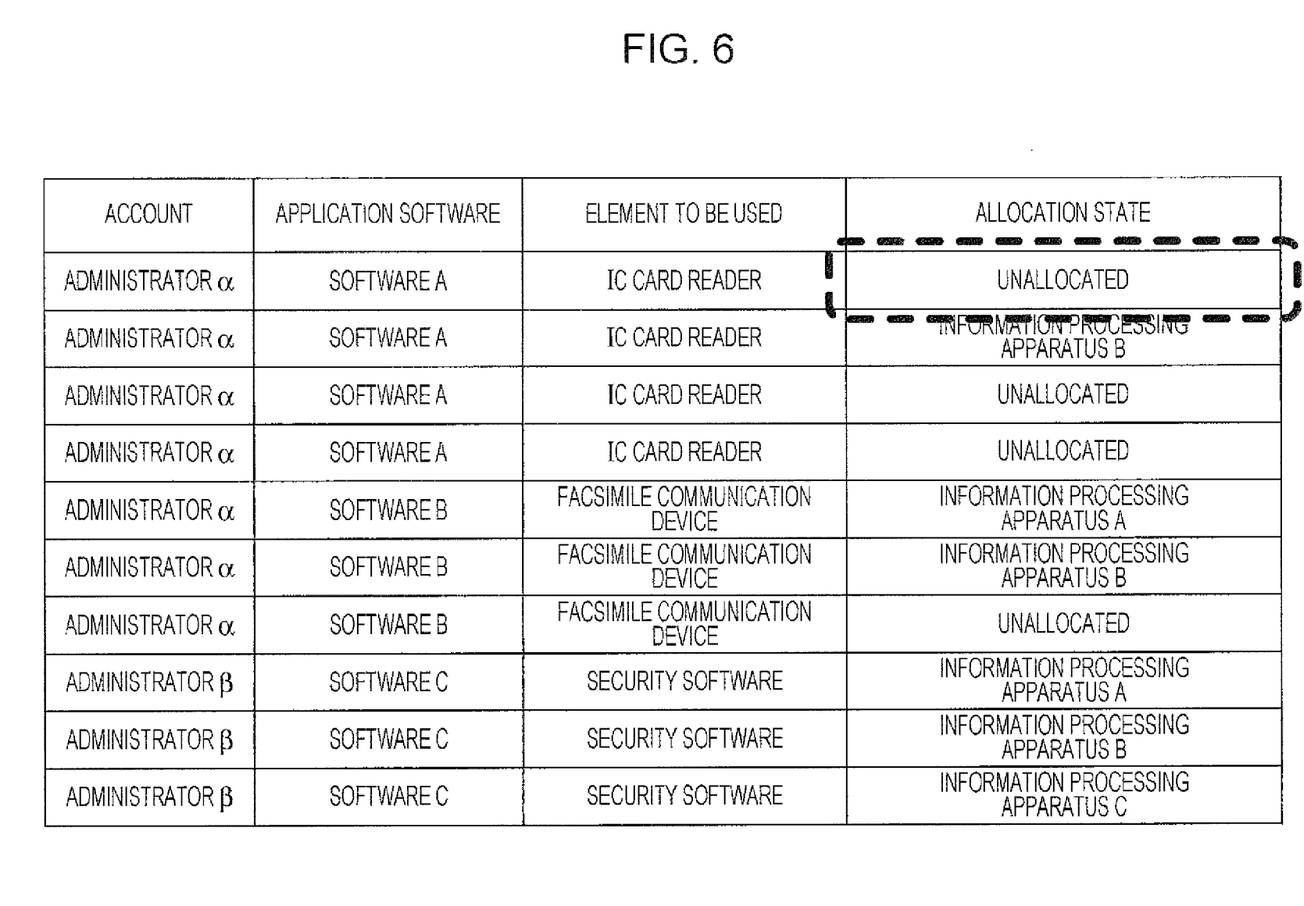
FIG. 6 is a table illustrating an example of management information updated by an updating unit.

FIG. 6 is a table illustrating an example of management information updated by the updating unit 64. The example shown in FIG. 6 corresponds to a case where a request for an update of the license information of the software A has been made from the information processing apparatus A because the software A is non-usable in the information processing apparatus A due to removal of the IC card reader 20 therefrom. FIG. 6 shows management information obtained when the management information shown in FIG. 5 has been updated. The license for the software A allocated to the information processing apparatus A in FIG. 5 is updated to an unallocated state, as shown in FIG. 6.

Figure 7:
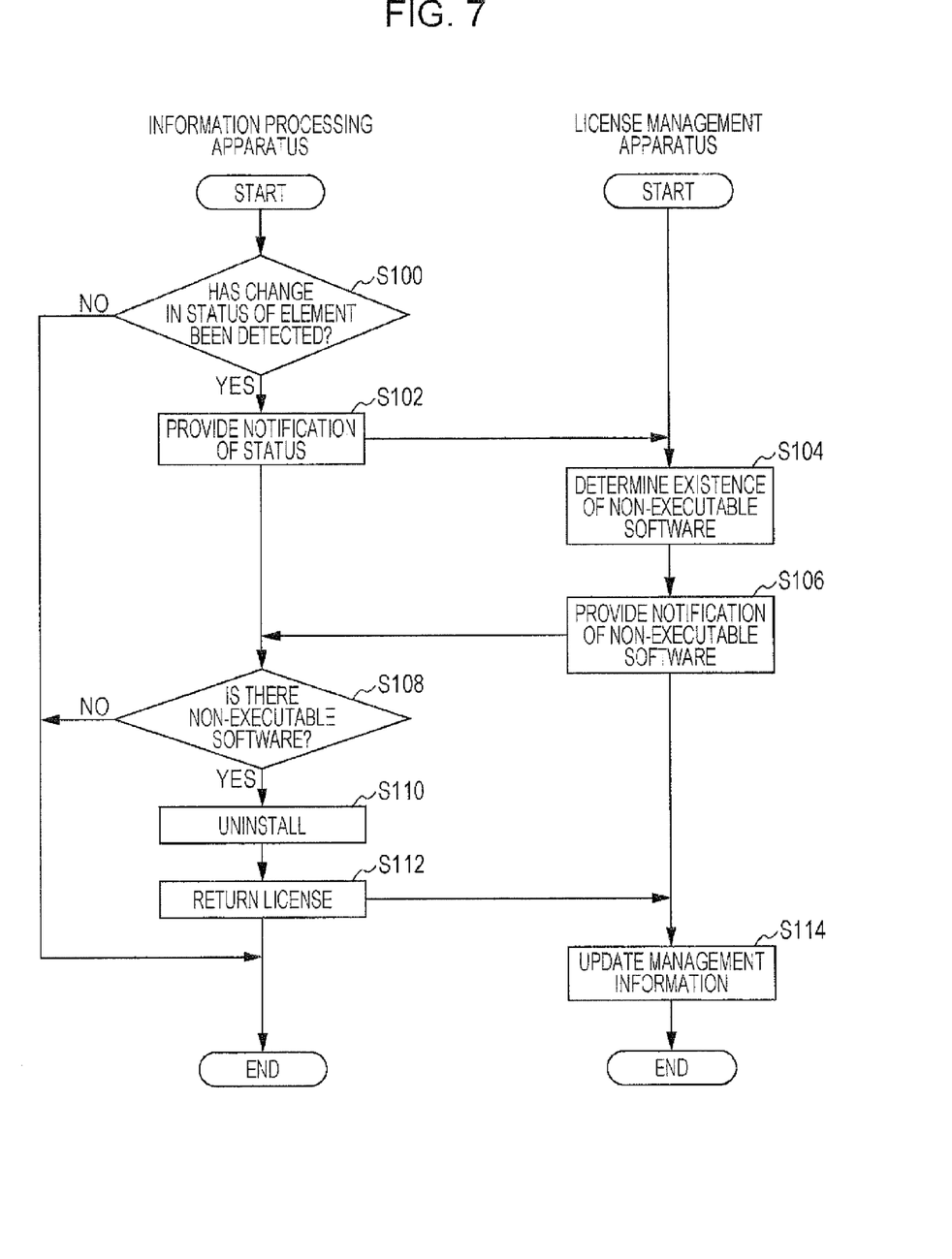
FIG. 7 is a flowchart illustrating an example of the operation of the license management system according to the exemplary embodiment.

FIG. 7 is a flowchart illustrating an example of the operation of the license management system 2 according to this exemplary embodiment.

In step 100 (S100), it is determined whether or not the detecting unit 50 of the information processing apparatus 4 has detected a change in the status of an element. If the detecting unit 50 detects a change in the status of an element, the operation proceeds to step 102. If there is no detection, the operation ends.

In step 102 (S102), the license management apparatus 6 is notified of the status detected by the detecting unit 50 of the information processing apparatus 4.

In step 104 (S104), the determining unit 60 of the license management apparatus 6 determines whether or not non-executable software exists in the information processing apparatus 4 serving as the notification source on the basis of the notification in step 102 and the management information stored in the management information storage unit 58.

In step 106 (S106), the determination result notifying unit 62 of the license management apparatus 6 notifies the information processing apparatus 4 serving as the notification source in step 102 of the determination result obtained by the determining unit 60. In detail, if it is determined in step 104 that non-executable software exists, a notification of the non-executable software is provided. If it is determined in step 104 that non-executable software does not exist, a notification of non-existence thereof is provided.

In step 108 (S108), it is determined whether or not a notification of non-executable software in the information processing apparatus 4 has been provided. If there is non-executable software, the operation proceeds to step 110. If there is no non-executable software, the operation ends.

In step 110 (S110), the deleting unit 56 of the information processing apparatus 4 uninstalls the non-executable software.

In step 112 (S112), the license update requesting unit 54 of the information processing apparatus 4 cancels the license for the non-executable software and makes a request to the license management apparatus 6 for an update of the license information.

In step 114 (S114), the updating unit 64 of the license management apparatus 6 updates the management information stored in the management information storage unit 58.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A license management system comprising:
   an information processing apparatus that executes software; and
   a management apparatus that manages license information of the software,
   wherein the information processing apparatus includes a processor configured to execute:
   a detecting unit that detects a status of a device controlled by software, a status of another software used for executing the software, or the status of a device used for executing the software;
   a status notifying unit that notifies the management apparatus of the status detected by the detecting unit;
   a license update notifying unit that notifies to request an update of license information of the software when the status detected by the detecting unit is a status that does not satisfy a condition desired for executing the software; and
   a deleting unit that deletes the software when the status detected by the detecting unit is a status that does not satisfy the condition desired for executing the software, however when the condition desired for executing the software is determined not to be satisfied due to a fault in a device, the license updating notifying unit requests the update of license information, but the deleting unit determines that the faulty state is temporary, and the deleting unit does not delete the software, and
   wherein the management apparatus includes a further processor configured to execute:
   a determining unit that determines whether or not the status of the element satisfies the condition desired for executing the software if the status of the element is notified from the information processing apparatus,
   a determination result notifying unit that provides a notification of a determination result obtained by the determining unit, and
   an updating unit that updates the license information if the update of the license information of the software is requested from the information processing apparatus.

2. The license management system according to claim 1, wherein the license update notifying unit notifies to request the update of the license information of the software when the device is detected as being removed from the apparatus.

3. The license management system according to claim 1, wherein the deleting unit deletes the software if the status of the element does not satisfy the condition desired for executing the software and if the status continues for a preset time period or longer.

4. The license management system according to claim 1, wherein the detecting unit detects the status of the device controlled by the software.

5. A non-transitory computer readable medium storing a program causing a computer to execute a process for processing information, the process comprising:

detecting a status of a device controlled by software, a status of another software used for executing the software, or the status of a device used for executing the software;

notifying to request an update of license information of the software when the detected status is a status that does not satisfy a condition desired for executing the software; and  deleting the software when the status detected by the detecting is a status that does not satisfy the condition desired for executing the software, however when the condition desired for executing the software is determined not to be satisfied due to a fault in a device, the notifying to request the update of license information occurs, but a determination that the faulty state is temporary occurs, and the software is not deleted.

\* \* \* \* \*